(12) United States Patent
Galomb

(10) Patent No.: US 9,987,767 B1
(45) Date of Patent: Jun. 5, 2018

(54) MATERIAL STRIPPING APPARATUS FOR EXTERNAL MIXING ELEMENT

(71) Applicant: David E Galomb, Allentown, PA (US)

(72) Inventor: David E Galomb, Allentown, PA (US)

(73) Assignee: GALOMB, INC., Allentown, PA (US)

(*) Notice: Subject to any disclaimer, the term of this patent is extended or adjusted under 35 U.S.C. 154(b) by 533 days.

(21) Appl. No.: 14/201,795

(22) Filed: Mar. 8, 2014

Related U.S. Application Data

(60) Provisional application No. 61/776,758, filed on Mar. 11, 2013, provisional application No. 61/776,765, filed on Mar. 11, 2013, provisional application No. 61/776,767, filed on Mar. 11, 2013, provisional application No. 61/777,500, filed on Mar. 12, 2013, provisional application No. 61/801,888, filed on Mar. 15, 2013.

(51) Int. Cl.
*B29B 7/80* (2006.01)

(52) U.S. Cl.
CPC .................................. *B29B 7/802* (2013.01)

(58) Field of Classification Search
CPC ............... B29B 7/802; B01F 15/00058; B01F 15/00019; B01F 7/1605; B01F 7/161; B01F 7/1615; G01F 23/045; G01F 23/04; B08B 1/005
USPC ............................. 366/347; 15/220.4, 218.1
See application file for complete search history.

(56) References Cited

U.S. PATENT DOCUMENTS

| | | | | |
|---|---|---|---|---|
| 3,606,094 A * | 9/1971 | Mills | ................... | A61C 9/0026 222/145.6 |
| 4,544,277 A * | 10/1985 | Schnellmann | ...... | B01F 11/0054 15/256.5 |
| 5,549,381 A * | 8/1996 | Hays | ..................... | B01F 7/0005 366/139 |
| 6,702,455 B2 * | 3/2004 | Vendrely | .............. | B01F 13/002 366/130 |

FOREIGN PATENT DOCUMENTS

WO   WO 2013113970 A1 *   8/2013   ......... A61B 17/8822

OTHER PUBLICATIONS

Academic paper entitled: "Improving Polymer Blend Dispersions in Mini-mixers" by Milan Maric and Christopher W. Macosko. Published in Polymer Engineering and Science, Jan. 2001, vol. 41 No. 1

Academic paper entitled: "A Novel Miniature Mixing Device for Polymeric Blends and Compounds" by Martin Sentmanat, Savvas G. Hatzikiriakos, and Christos Stamboulides. Published by Polymer Engineering and Science 2009 vol. 49 Issue 11.

\* cited by examiner

*Primary Examiner* — Walter D. Griffin
*Assistant Examiner* — Marc C Howell

(57) ABSTRACT

An apparatus for removing material residue from an external mixing element as it is being withdrawn from an external vessel containing the material mixed by the mixing element. The apparatus includes a stationary support member, a repositionable support assembly, and a rotatable material stripping element held captive by at least one element of the repositionable support assembly.

18 Claims, 4 Drawing Sheets

FIG. 3A  FIG. 3B  FIG. 3C
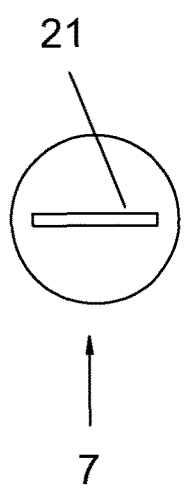
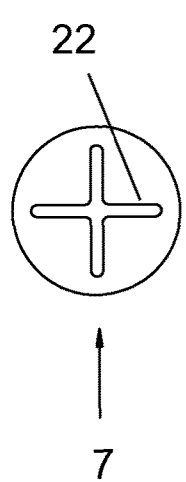
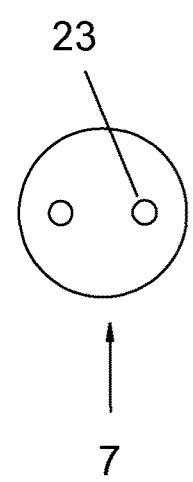
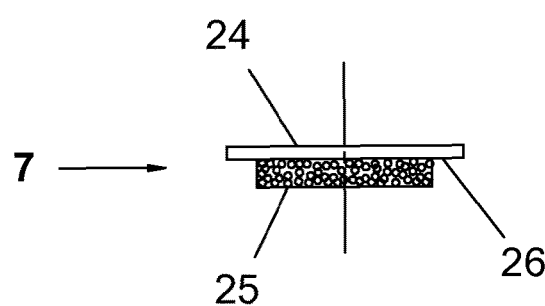
FIG. 4

MATERIAL STRIPPING APPARATUS FOR EXTERNAL MIXING ELEMENT

CROSS-REFERENCE TO RELATED APPLICATIONS

This application claims priority under 35 U.S. Code § 119 of U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, all of which are hereby incorporated by reference in their respective entireties.

This application is also related to co-pending applications entitled: Support Apparatus for Injection Tube Assembly; Mixing Tool with Integrated Material Stripping Element; System and Method for Mixing Polymers and Producing an Injection Molded Part; Injection Tube Assembly with Integrated Material Stripping Element and a Polymer Mixing System for Employing the Same, all filed on the same day as this U.S. Non-Provisional application and all hereby incorporated by reference in their respective entireties.

FIELD

The field relates generally to laboratory size apparatuses and systems for melting, mixing, and processing polymers, and more particularly to an apparatus for removing material residue from an external mixing element as it being withdrawn from an external vessel.

BACKGROUND

Polymers are often distinguished from other materials because they tend to have special challenges when mixing them, such as having to be melted at relatively high temperatures before they can be mixed, and often being very viscous and sticky in their molten state. Most polymers also have a narrow window in time to complete the mixing operation at the elevated temperature before they begin to degrade.

By and large polymers (e.g. thermoplastics) are mixed commercially via what is commonly referred to as continuous processing equipment, such as production type extruders and injection molding machines. Whereby the desired polymer is continually fed into such machines, usually along with some other additive, such as a colorant or filler, where it is melted and mixed with the said additive during the process of forming it into a desired shape, such as a plastic injected molded part, or an extruded profile.

These systems and machines work well for producing many parts very quickly, but are typically large in size, weighing thousands of pounds, and require extensive set-up time and rigorous process control to operate, and are very expensive.

These attributes also make them very difficult and inconvenient to use if one wishes to just make one part or a few parts for evaluation or testing purposes. Testing and evaluating a polymer before attempting to use it commercially in a product is almost always a prerequisite, so regardless of the cost and inconvenience, it is usually done.

Additionally, scientists and researchers are greatly hindered in their attempts to quickly develop and test new polymer formulations and mixtures when they are forced to use these large production machines to melt, mix and mold their test samples.

There are companies who have attempted to address this problem with varying degrees of success. Some have created essentially mini versions of production line equipment allowing it to be used in a laboratory environment to melt and mix the polymers and then either extrude the mixed material into a desired profile or form it into an injection molded part. Others have created stand alone machines and devices, also suitable for use in a laboratory environment to melt and mix a desired polymer, and then expel it in molten form, so the user can evaluate the mixed material. Although the line between a stand-alone melt and mixing machine and a mini-production system is somewhat blurred because some systems are comprised of multiple machines or apparatuses that are either used in cooperation with each other or attached together as add-on pieces of equipment for further downline processing of the mixed molten polymer.

Some equipment and systems known to the applicant for melting, mixing and processing polymers on a laboratory scale are as follows:

The "Mini-Compounder KETSE 12/36" manufactured and sold by C.W. Brabender® Instruments, Inc. located in South Hackensack, N.J., USA The "LME Laboratory Mixing Extruder" manufactured and sold by Dynisco, located in Franklin, Mass., USA The "LMM Laboratory Mixing Molder" manufactured and sold by Dynisco, located in Franklin, Mass., USA The "RCP-0250 Microtruder" manufactured and sold by Randcastle Extrusion Systems, Inc., located in Cedar Grove, N.J., USA The "DSM Xplore 5 ml Micro-compounder" manufactured and sold by DSM Xplore located in the Netherlands.

The "DSM Xplore Micro Injection Moulding Machine" manufactured and sold by DSM Xplore located in the Netherlands.

The "MicroInjector" manufactured and sold by DACA Systems located in Goleta, Calif., USA.

The "Microcompounder" manufactured and sold by DACA Systems located in Goleta, Calif., USA.

The "Thermo Scientific Haake MiniLab II Micro-Compounder" manufactured and sold by Thermo Scientific, located in Waltham, Mass.

Also known is an academic paper (published in Polymer Engineering and Science, January 2001, Vol. 41 No. 1) entitled: "Improving Polymer Blend Dispersions in Mini-mixers" by Milan Maric and Christopher W. Macosko. The researchers in that study evaluated several different laboratory size polymer mixing systems and machines on the market and compared them against each other, noting some of the shortcomings of each.

Although the apparatuses and systems on the market today may be suitable for their intended purposes, they all fall short of most users' desires in some way. The mini-production line systems are still very expensive and still require a significant amount of process control to operate. They are also cumbersome to clean and maintain and take up a lot of laboratory space. The stand-alone machines are also expensive and although smaller, they are also difficult to clean and maintain, plus they carry additional limitations and drawbacks, such as in some cases producing inferior mixing quality.

In any case, it is clearly evident there still remains a great unmet need for a simpler, more affordable, easier to operate, easier to clean and maintain, versatile, robust system that can melt, mix and process polymers in a laboratory environment with consistent high quality. What is disclosed hereafter is the answer to that great unmet need.

SUMMARY

A material stripping apparatus for removing material residue from an external mixing element as it is being withdrawn from an external vessel containing the material to be mixed with the said mixing element. Unmixed material is first placed in the vessel. Then the material stripping apparatus is positioned over the said vessel in close communication therewith, covering its opening. An external mixing element is then fed through a rotatable stripping element embodied in the material stripping apparatus and then into the vessel to mix the material. After the material is mixed, the mixing element is withdrawn from the vessel, and back through the said rotatable stripping element, which effectively strips off whatever material residue there remains sticking to the said mixing element, leaving substantially all of it in the said vessel. The material stripping apparatus may then be separated from close communication with the vessel and repositioned away, allowing the user unobstructed access to the said vessel. By covering the vessel opening, the material stripping apparatus also serves to prevent the material from escaping during the mixing operation and during the stripping operation. The material stripping apparatus, in at least one embodiment, also serves to prevent the vessel from moving during the mixing operation. The material stripping apparatus, in at least one embodiment, also serves to keep the vessel held down in its place during the stripping operation, as the mixing element is being withdrawn therefrom. These and other advantages of the invention will become apparent after reading the detailed description below.

BRIEF DESCRIPTION OF THE DRAWINGS

FIGS. 3A and 3B and 3C each illustrate the top view of a material stripping element in an exemplary alternative embodiment.

FIG. 4 illustrates the side view of a material stripping element in an exemplary alternative embodiment.

DETAILED DESCRIPTION

Apparatus Construction

Figure 1:
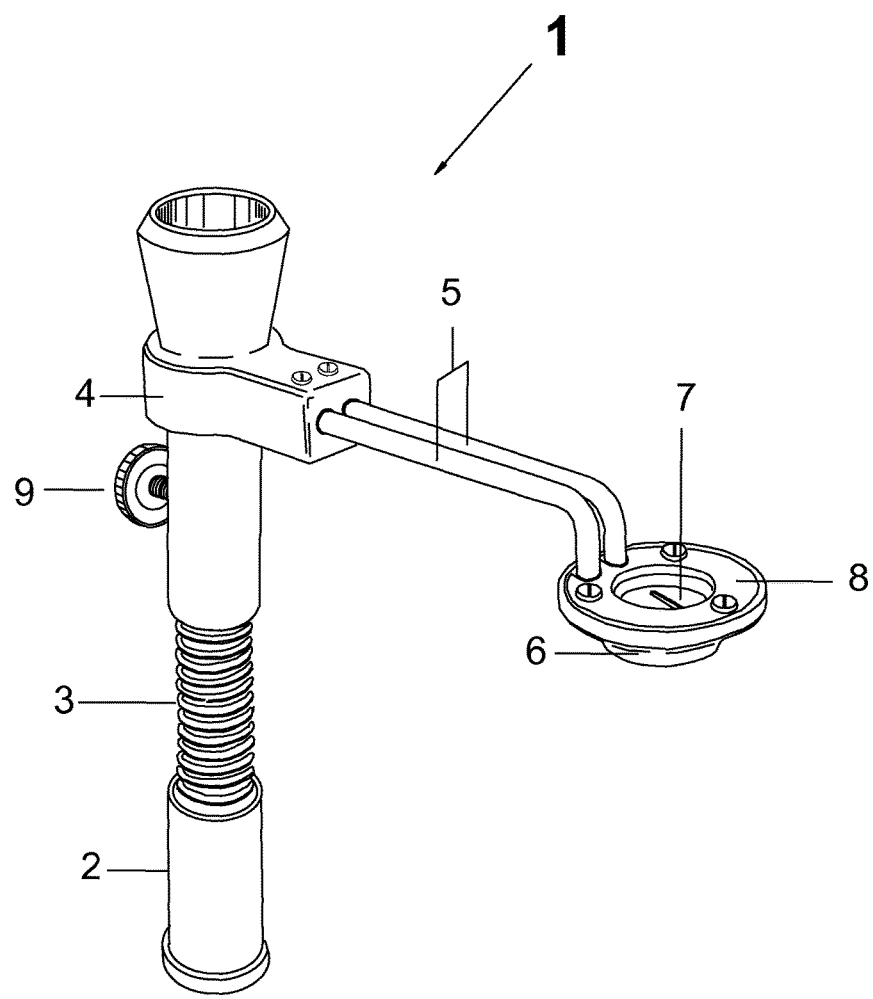
FIG. 1 illustrates an isometric view of an assembled material stripping apparatus in one embodiment.

FIG. 1 illustrates an isometric view of one embodiment of a material stripping apparatus 1 comprising: a vertical support member 2, a compression spring 3, a collar 4, a horizontal support member 5, a stripping element support tray 6, a material stripping element 7, a retaining ring 8, and a lock screw 9.

Figure 2:
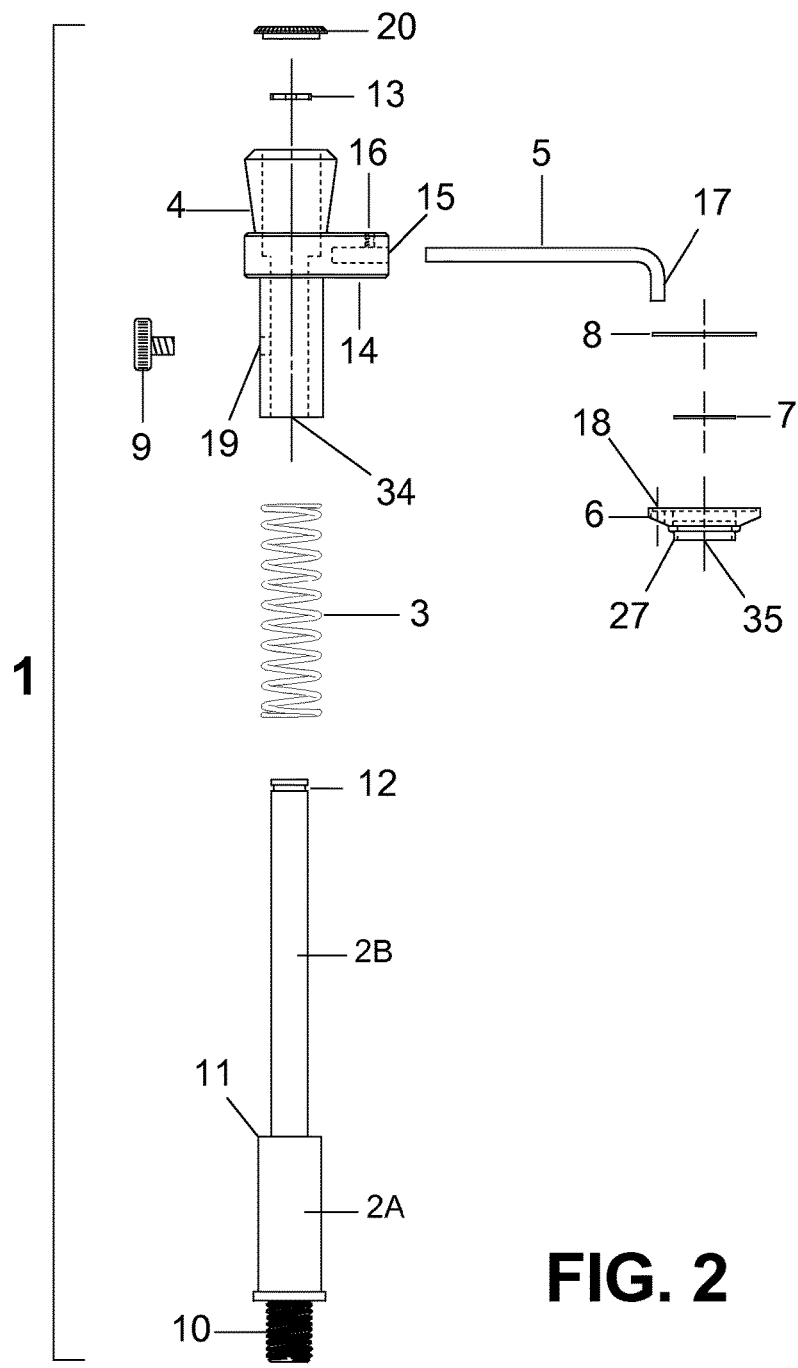
FIG. 2 illustrates an exploded side view of a material stripping apparatus in one embodiment.

FIG. 2 illustrates an exploded side view of the apparatus 1. In this exemplary embodiment, the vertical support member 2 is a metal rod with its lower portion 2A having a larger diameter than its upper portion 2B. The said lower portion 2A also has a threaded end 10, allowing the apparatus 1 to be mounted to a desired surface after it's assembled. The compression spring 3 slides over the upper portion 2B of the vertical support 2 until it rests against the top surface 11 of the lower portion 2A. The collar 4, which has a hole 34 extending entirely through its vertical axis, slides over the upper portion 2B of the vertical support 2, compressing the spring 3 until a machined groove 12 near the top edge of the said support 2 extends through the collar 4. While holding the collar 4 in that position (i.e. with the groove 12 exposed), a retaining clip 13 is attached to the groove 12. Once attached, the collar 4 can be released, as it is now secured to the vertical support 2. The collar 4 remains secured because only a portion of the hole 34 extending through it has a diameter large enough for the retaining clip 13 to pass through. The remainder of the hole 34, approximately the bottom half, is only large enough for the vertical support 2B to slide though. So, once the retaining clip 13 is secured to the support 2, the collar 4 will only spring back until the retaining clip 13 butts up against the said smaller diameter portion of the said through hole 34, and therefore the collar 4 remains captive between the retaining clip 13 and the compression spring 3.

The collar 4, which is typically made of metal and casted or machined to a desired specification, has a protruding section 14 extending from one side surface with two blind holes 15 machined into it to accommodate the receipt of two horizontal support members 5 (only one is shown in FIG. 2). The horizontal support members 5, which in this embodiment are metal rods cut and bent to a desired orientation, are inserted into the two respective blind receiving holes 15 of the collar 4 and then locked in that position by tightening two set screws 16 threaded into the top surface of the protruding section 14 of the collar 4. The said set screws 16 extend into the blind holes 15, so when they are tightened they come in close communication with the horizontal members 5 inserted therein, thus locking them in place. It should be noted, although this exemplary embodiment of the apparatus 1 employs the use of two support members 5, a single support member 5 could be alternatively employed if desired, and still function as intended.

In any event, the horizontal members 5 are bent at one end 17 to a desired angle, which in this embodiment is approximately 90 degrees, and inserted into two corresponding holes 18 in the top surface of the support tray 6 and secured therein either mechanically or by brazing or welding. The said tray 6 is also constructed of metal and machined to a desired specification.

The material stripping element 7, which in one embodiment preferably has the shape of a flat disc, is placed inside the support tray 6 until it comes in close communication with an internal ledge with an inside diameter slightly less than the overall diameter of the said element 7, thus allowing the said element 7 to rest on its outer periphery on top of the said ledge and not fall through a center hole 35 in the said tray 6. It should be noted, alternative embodiments of the material stripping element 7 will also be described later.

The retaining ring 8 is secured to the support tray 6, typically with screws. The said retaining ring 8 is constructed of metal and machined to a desired specification, and has a center hole that is slightly smaller than the outer diameter of the stripping element 7. Once the retaining ring 8 is secured in place, the stripping element 7 is essentially trapped in the tray 6 with the internal ledge of the said tray 6 beneath it and the retaining ring 8 above it. Although there remains enough free space between them so the said stripping element 7 can freely rotate within its captive space in the tray 6. An alternative embodiment will also be disclosed later, that eliminates the need for the retaining ring element 8 to hold the stripping element 7 captive in the tray 6.

The lock screw 9 is partially screwed into a tapped hole 19 in the collar 4. The lock screw 9 illustrated in this specification is a thumb screw, but obviously other types of equivalent locking means could be used instead without departing from the spirit of the invention. An alternative, more elaborate locking means will also be described later.

If desired, an end cap 20 may also be placed on top of the collar 4 to cover the center hole 34. However, it shall be appreciated; the said end cap 20 is not required for the apparatus 1 to function as intended, but rather serves primarily for aesthetics and user comfort. The said end cap 20 is typically made of rubber or soft plastic. The apparatus 1 is now assembled.

Apparatus Operation

The apparatus 1 is typically employed in cooperation with a predetermined external mixing element and a predetermined external vessel containing the material desired to be mixed. The purpose of the apparatus 1 is to strip off material residue from the said external mixing element as it is being withdrawn from the said external vessel, after having just mixed the material therein.

The apparatus 1 is first mounted in close proximity to a predetermined external vessel containing the material desired to be mixed. When the apparatus 1 is constructed according to the embodiment illustrated in FIG. 2, it may be mounted to a base plate or other work surface by screwing the threaded end 10 of the vertical support 2 into a threaded hole in the said base plate or other work surface, such that it remains stationary when secured thereto.

The proper stripping element 7 is then selected for placement in the tray 6. This choice is determined by the particular mixing element being employed in cooperation with the apparatus 1, and also by the particular material being mixed. FIGS. 3A, 3B, and 3C each illustrate the top view of an exemplary alternative embodiment of the stripping element 7, each comprising a disc shape with a predetermined through hole geometry optimized to accommodate the geometry of a predetermined mixing element. In particular, FIG. 3A shows one embodiment of the stripping element 7 with a straight slotted through hole 21, which would typically be selected to accommodate a mixing element comprising a flat blade or a helical blade geometry that will fit through the said slot 21. It should also be explained before moving one, the straight slotted through hole 21 in the said stripping element 7 is able to accommodate the insertion and withdrawal of the helically shaped blade because the stripping element 7 will simply rotate around it as it feeds through the slot 21, so the said blade does not bind. When the helical blade is fully extended through the slot 21 and is rotating, such as during the mixing operation, the said stripping element 7 then rotates along with the said rotating helical blade.

Moving on, FIG. 3B shows another embodiment of the stripping element 7 comprising a cross type though hole 22, which would typically accommodate a mixing element comprising two flat blades that intersect with each other, essentially resembling a cross if viewed from its longitudinal end. FIG. 3C shows yet another embodiment of the stripping element 7 with two round through holes 23 spaced apart from each other, which would typically accommodate a mixing element having two round rods spaced apart from each other the same distance as the holes 23 in said element 7. Obviously many other hole configurations in the stripping element 7 are possible without departing from the spirit of the invention.

When fabricating the stripping element 7, another consideration is the type of material it is intended to be strip off. Materials can vary widely in their properties. So the stripping element 7 may be fabricated with many different materials designed to achieve the best results for use with the particular material being mixed. For example, in one embodiment the stripping element 7 may be fabricated from metal to resist high temperatures and also be long lasting. In an alternative embodiment, the stripping element 7 may be fabricated from a desired plastic such as PTFE because of its non-stick properties and ease of cleaning.

If desired, the stripping element 7 may comprise an alternative geometry from the flat disc examples illustrated in FIGS. 3A, 3B, and 3C. For example, FIG. 4 illustrates the side view of one alternative embodiment of the material stripping element 7 comprising a metal disc 24 that is relatively thin, bonded to or otherwise joined together with a desired material 25 or a composite of materials. Some materials suitable for this purpose, without limitation, may include: cloth and other fibrous materials, compressed metal wool, rubber, silicone, and plastic. As is evident by viewing the example shown in FIG. 4, constructing the stripping element 7 according to this embodiment results in it having a substantially thicker geometry, except for around its peripheral edge 26, which now essentially functions as the lip or similar flange portion of the said element 7 that rests upon the inside ledge of the tray 6. One reason it would be desirable to construct the stripping element 7 according to the embodiment of FIG. 4 is to help prevent material residue from sticking to the said element 7, thereby making it easier to clean. Another reason it would be desirable to construct the stripping element 7 according to the embodiment of FIG. 4 is to help optimize its stripping capability. For example, if the disc 24 portion is constructed of metal, another material 25, such as a soft silicone rubber might be also be incorporated into the element 7 to protect the mixing element from being damaged by rubbing against the metal edges of the through hole (e.g. 21, 22, 23) as it feeds through it, as well as improve its stripping effectiveness by making the element 7 better conform to the geometry of a predetermined mixing element, which is particularly desirable when the said mixing element has a contoured shape, for example like a helically shaped blade or ribbon.

In any event, once the desired stripping element 7 is selected, it is placed inside the tray 6. Then the retaining ring 8 is secured to the tray 6 over the said element 7 to keep it retained therein. However, it shall be appreciated; the retaining ring 8 illustrated and described in this specification is only exemplary. There are many different ways the stripping element 7 could be secured to or otherwise held captive in the said tray 6 and still have the ability to rotate freely. For example, without limitation, the said tray 6 could simply comprise a machined groove or undercut around its inner periphery (not shown), allowing the said stripping element 7 to essentially snap into place in the said groove, but still be capable of rotating once secured therein, which would eliminate the need for a separate retaining ring 8 element altogether. Whereas, in this hypothetical alternative embodiment the said stripping element 7 would be constructed to slightly flex, at least on its outer periphery 26, allowing it to snap-fit it into the said groove or undercut of the tray 6.

Next, the position of the tray 6 is adjusted so it is directly over the vessel. With the lock screw 9 loosened, the collar 4 is able to swivel freely around the stationary vertical support 2 member, so the said tray 6 is easily rotated to either side of the vessel until the proper position is found. If necessary, the position of the tray 6 can also be adjusted forward or backward by loosening the set screws 16 in the collar 4, which allows the horizontal supports 5 to be extended or retracted within the blind holes 15 until the tray 6 is positioned directly above the vessel. This feature is particularly useful when the apparatus 1 is mounted to a fixed surface rather than to a portable base plate that can be moved forward or backward as needed. In fact, this feature also allows the horizontal supports 5 and attached support tray 6 to be readily removed from the said apparatus 1 altogether if desired and substituted with a horizontal support member 5 and tray 6 of an alternative embodiment. For example, one where the tray 6 has an alternative geometry that is optimized to fit the opening of a different size vessel. In any event, once the tray 6 is in alignment with the opening of the vessel, the set screws 16 are re-tightened.

Assuming the material is already in the vessel waiting to be mixed, the tray 6 is then lowered until its bottom edge 27 (See FIG. 2) comes in close communication with the top edge of the vessel, and then the tray 6 is removably locked in close communication therewith by tightening the lock screw 9, thereby effectively covering vessel's top opening.

Lowering the tray 6 is accomplished by the user pushing down on top of the collar 4 with his or her hand. Since the collar 4 rests on top of the compression spring 3 it will slide down the stationary support member 2 when pressure is put on it, until the spring 3 is fully compressed. However, when there is a vessel located underneath the tray 6, the collar 4 will only push down until the tray 6 makes contact with the said vessel. This is because when the apparatus 1 is assembled, the collar 4 and tray 6 and horizontal supports 5 are all connected to each other, enabling them to be lowered, raised and rotated together as a unit. However, as already described, the horizontal supports 5 and attached tray 6 can additionally be extended and retracted from the collar 4, or removed altogether and replaced if desired.

It should be explained more thoroughly at this point, the tray 6 in one embodiment is constructed to accommodate a predetermined vessel opening. Basically, this means that the outside surface and bottom edge 27 of the tray 6 is constructed in such a way that when it comes in close communication with the top edge of the vessel opening, a close fit will be created between them, which is desired to minimize the amount of material that can escape from the vessel during the mixing operation. In at least in one embodiment, the said tray 6 also serves to hold the vessel in its place to prevent it from rotating during the mixing operation. Likewise, in at least one embodiment the tray 6 also serves to hold the vessel in its place as the mixing element is being withdrawn therefrom, during the stripping operation. Some other examples of how the tray 6 may be constructed to accommodate a particular vessel opening are, without limitation: chamfering one or more of its surfaces to best fit the contours or shape of the vessel opening; closely matching the diameter of the bottom edge 27 of the tray 6 with the diameter of the vessel opening; integrating a rubber o-ring or other sealing means (not shown) around the periphery of the tray 6 in close proximity to the said tray edge 27. As already mentioned, because the horizontal support 5 and tray 6 are easily removed from the collar 4, numerous alternative embodiments of the said horizontal support 5 and tray 6 may be employed with the same apparatus 1.

Next, the predetermined external mixing element, which is typically attached to an overhead mixing device by means of a shaft, is positioned above the vessel and tray 6 and then lowered so that it first inserts through the predetermined hole (e.g. 21, 22, 23) embodied in the selected stripping element 7 and then extends into the vessel. The mixing device is then turned on causing the mixing element to rotate and mix the materials inside the vessel. As the mixing element rotates, the stripping element 7 also rotates along with it, however still remaining captive in the tray 6.

When the mixing operation is complete the mixing device is turned off, which stops the mixing element from rotating. Typically, the mixing element will then be disconnected from the mixing device, or a shaft extending therefrom, by the user, allowing the said user to withdraw the said mixing element out of the vessel by hand. As the mixing element is being withdrawn from the vessel it also necessarily feeds back though the material stripping element 7 covering the vessel opening, and whatever material residue there remains sticking to the said mixing element is substantially stripped off by the said stripping element 7, leaving it inside the vessel.

Once the mixing element is removed from the vessel and set aside, the lock screw 9 of the apparatus 1 is then loosened, causing the collar 4, the horizontal supports 5 and support tray 6 with the stripping element 7 held captive therein to spring back up, and off of the vessel. If desired, the said collar 4 can also be rotated on the stationary support member 2 to reposition the tray 6 away from the vessel opening, allowing better user access to the said vessel for subsequent removal. At this point the stripping element 7 and tray 6 are also typically cleaned off by hand, to remove whatever little material residue remains sticking to them if any, so they can be reused.

As mentioned earlier, the means to removably lock the collar 4 in a desired position may have alternative constructions if desired without departing from the spirit of the invention. For example, without limitation, the lock screw 9 may be spring loaded, and the upper portion 2B of the stationary vertical support 2 may have at least one notch or divot (not shown) machined into it at a predetermined location. Such that when the collar 4 is lowered by the user pushing down on it, the said lock screw 9 will automatically engage when in alignment with the said notch or divot, thus locking the collar 4 in that position. The user would then simply need to pull back on the (spring loaded) lock screw 9 to disengage it, allowing the collar 4, horizontal support 5, and tray 6 with stripping element 7 held captive therein to spring back up. Although not detailed in the exemplary apparatus 1 illustrated, it is certainly contemplated that a means to removably lock the tray 6 in close communication with the vessel may be alternatively embodied in the tray 6 itself.

Best Mode and Other Embodiments

Figure 5:
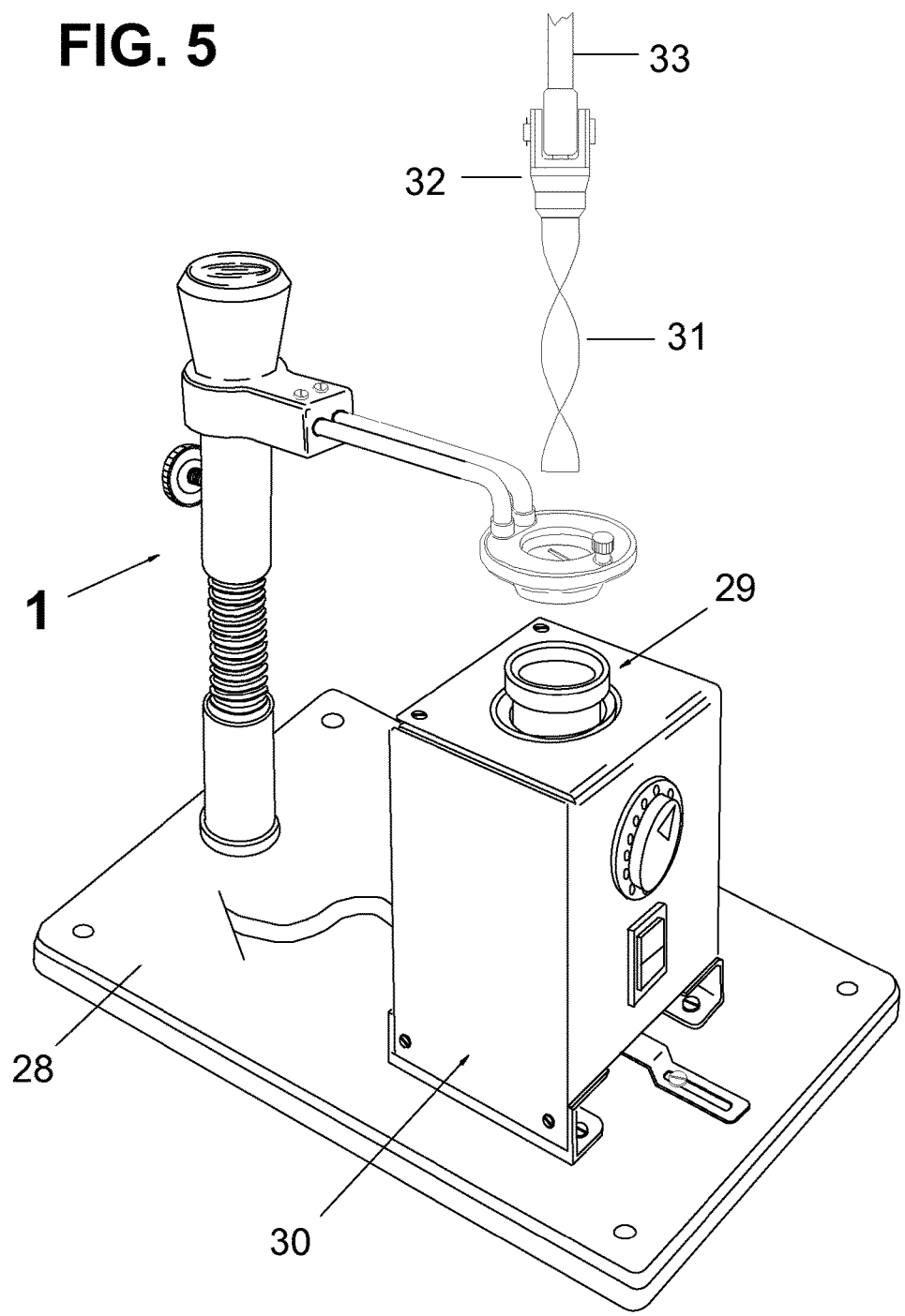
FIG. 5 illustrates an isometric view of an assembled material stripping apparatus as it would typically be employed in one embodiment.

It shall be apparent from reading the specification that the apparatus 1 may comprise multiple alternative embodiments without departing from the spirit of the invention, as well as accommodate and cooperate with external mixing elements and external vessels each having their own alternative embodiments. However, one embodiment of the apparatus 1 that is particularly suitable for use in the marketplace is illustrated in FIG. 5, where the said apparatus 1 mounts to a base plate 28, and the predetermined external vessel is an injection tube assembly 29, removably secured in an injection tube assembly support apparatus 30. And a predetermined external mixing element 31 is attached to a mixing device, such as an overhead mixer (not shown). The said mixing element 31 may be of any desired configuration, but in this exemplary figure is a helical blade 31 comprising a clevis 32 that removably secures it to a shaft 33 extending from the said overhead mixer (not shown).

Detailed alternative embodiments of the apparatus 29 and the apparatus 30 and related information are also disclosed in U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, and the co-pending U.S. Non-Provisional Applications entitled: Support Apparatus for Injection Tube Assembly; Mixing Tool with Integrated Material Stripping Element; System and Method for Mixing Polymers and Producing an Injection Molded Part; Injection Tube Assembly with Integrated Material Stripping Element and a Polymer Mixing System for Employing the Same, all filed on the same day as this U.S. Non-Provisional application, and all hereby incorporated by reference in their respective entireties.

Some Advantages, without Limitation:

Providing a means to strip material residue from a predetermined external mixing element 31 as it is being withdrawn from a predetermined external vessel 29 containing the material.

Providing an apparatus 1 that comprises a support member 2 easily attachable to a desired base plate or other surface, such that it remains stationary when secured thereto, and a repositionable support assembly 4, 5, 6 that is easily positioned over the opening of an external vessel before the mixing operation, and then easily repositioned away from the vessel opening after the mixing operation is complete.

Providing an extendable and retractable support member 5 that allows the support tray 6, and the material stripping element 7 held captive therein, to be repositioned closer to or further away from the collar 4, allowing for minor positional adjustments of the said tray 6 and stripping element 7 when placing them over the external vessel opening to cover the same.

Providing a horizontal support member 5 and tray 6 that is removable from the apparatus 1, allowing for the attachment of an alternative horizontal support member 5 and tray 6.

Providing a means to block or otherwise cover the opening of an external vessel to prevent material from escaping the said vessel during the mixing operation. For example, by means of the tray 6 positioned in close communication with the said vessel.

Providing a means to block or otherwise cover the opening of an external vessel to prevent material from escaping the said vessel during the material stripping operation. For example, by means of the tray 6 positioned in close communication with the said vessel.

Providing a material stripping element 7 that rotates during the mixing operation.

Providing a material stripping element 7 that rotates during the stripping operation.

Providing a material stripping element 7 that is removable from the repositionable support assembly 4, 5, 6.

Providing a material stripping element 7 comprising at least one material 25 that optimizes it for stripping off a particular type of material residue.

Providing a material stripping element 7 comprising at least one material 25 that optimizes it for the geometry of an external mixing element.

Providing a material stripping apparatus 1, wherein the material stripping element 7 is capable of rotating independently of the mixing element 31, such as for example when a helically shaped mixing element is withdrawn and inserted through a stripping element 7.

Providing, in at least one embodiment, a means to keep the predetermined external vessel held its place during the material stripping operation, for example by means of the tray 6 positioned in close communication with the said vessel.

Providing, in at least one embodiment, a means to prevent the predetermined external vessel from moving during the mixing operation, for example by means of the tray 6 positioned in close communication with the said vessel.

Providing at least one means to removably lock the repositionable support assembly 4, 5, 6 in a desired position, for example by means of the lock screw 9 being tightened.

Providing at least one means to removably lock the support tray 6 in close communication with the external vessel, for example by means of the lock screw 9 being tightened.

Providing at one element of the repositionable support assembly 4, 5, 6 that is removably lockable in close communication with the external vessel. For example, the tray 6 by means of the lock screw 9 being tightened.

Providing at least one element of the repositionable support assembly 4, 5, 6 that is optimized to fit the opening of an external vessel. For example, the tray 6 by means of a chamfered bottom edge 27.

Providing in at least one embodiment an apparatus 1 optimized for vessel comprising an injection tube assembly 29.

It shall be appreciated; the apparatus 1 is not limited to the above advantages. Also, not all of the recited advantages must be present simultaneously for the apparatus 1 to function as intended.

What is claimed is:

1. A material residue stripping apparatus, the apparatus comprising: a support member configured for stationary mounting to a work surface; a repositionable support assembly attached to the said support member and holding captive a material stripping element comprising at least one through hole configured to accommodate the insertion and withdrawal of a mixing element that is non-integral to the claimed apparatus, the said material stripping element enabled for rotation in its captive location, the said repositionable support assembly configured to be removably repositionable in close communication with a vessel that is non-integral to the claimed apparatus when the said support member is stationarily mounted to a work surface.

2. The apparatus of claim 1 wherein the material stripping element is removable from its captive location in the repositionable support assembly.

3. The apparatus of claim 1 wherein the material stripping element is in the shape of a disc.

4. The apparatus of claim 1, wherein at least one portion of the material stripping element is thicker than its outer periphery.

5. The apparatus of claim 1 wherein the material stripping element is configured to rotate in its captive location while stripping material residue from a non-integral mixing element.

6. The apparatus of claim 1 wherein the material stripping element is configured to rotate when a non-integral mixing element, inserted through the at least one through hole, is rotated.

7. The apparatus of claim 1 wherein the material stripping element is configured to rest on its outer periphery while held in its captive location.

8. The apparatus of claim 1 wherein the at least one through hole of the material stripping element is geometrically configured according to the material intended to be stripped off.

9. The apparatus of claim 1 wherein the at least one through hole of the material stripping element is geometrically configured according to the geometry of the mixing element intended to be inserted therethrough.

10. The apparatus of claim 1 wherein the at least one through hole of the material stripping element is geometrically configured to accommodate the insertion and withdrawal of a non-integral helically shaped mixing element.

11. The apparatus of claim 1 wherein the material stripping element comprises a composite of materials bonded together to optimize functionality of the said element.

12. The apparatus of claim 1 wherein the repositionable support assembly is removably lockable in at least one position.

13. The apparatus of claim 1 wherein at least one element of the repositionable support assembly is configured to removably cover an opening in the said non-integral vessel with a predetermined close fit.

14. The apparatus of claim 13 wherein at least one element of the repositionable support assembly is configured to prevent material from escaping through the said vessel opening.

15. The apparatus of claim 1 wherein at least one element of the repositionable support assembly is configured to prevent the said non-integral vessel from moving when removably positioned in close communication therewith.

16. The apparatus of claim 1 wherein at least one element of the repositionable support assembly is extendible and retractable relative to the said support member.

17. The apparatus of claim 16 wherein the extendible and retractable element is removably attached to the apparatus.

18. The apparatus of claim 1 wherein the non-integral vessel is an injection tube assembly comprising at least a hollow cylindrical tube and a nozzle with an orifice.

* * * * *